United States Patent
Bayre

[15] 3,699,805
[45] Oct. 24, 1972

[54] ULTRASONIC TESTING APPARATUS
[72] Inventor: Willard W. Bayre, Amherst, Ohio
[73] Assignee: General Motors Corporation, Detroit, Mich.
[22] Filed: July 26, 1968
[21] Appl. No.: 747,942

[52] U.S. Cl....................................73/67.6, 310/8.3
[51] Int. Cl..............................................G01n 29/04
[58] Field of Search....................73/67.5–67.9, 71.5; 310/8.3, 8.7

[56] References Cited

UNITED STATES PATENTS

| | | | |
|---|---|---|---|
| 2,912,853 | 11/1959 | Hanysz | 73/67.6 |
| 3,168,659 | 2/1965 | Bayre et al. | 310/8.3 |
| 3,233,450 | 2/1966 | Fry | 73/67.8 |
| 3,239,801 | 3/1966 | McGaughey | 340/10 |

Primary Examiner—James J. Gill
Assistant Examiner—John P. Beauchamp
Attorney—E. W. Christen, C. R. Meland and Tim G. Jagodzinski

[57] ABSTRACT

An ultrasonic testing apparatus including an ultrasonic lens having a double curved focusing face defined by two different constant curvatures each extending along a different one of two perpendicular reference axes so that each of the ultrasonic energy rays or wave trains in an ultrasonic beam passing through the focusing face is deflected at a different angle along each of the reference axes.

6 Claims, 4 Drawing Figures

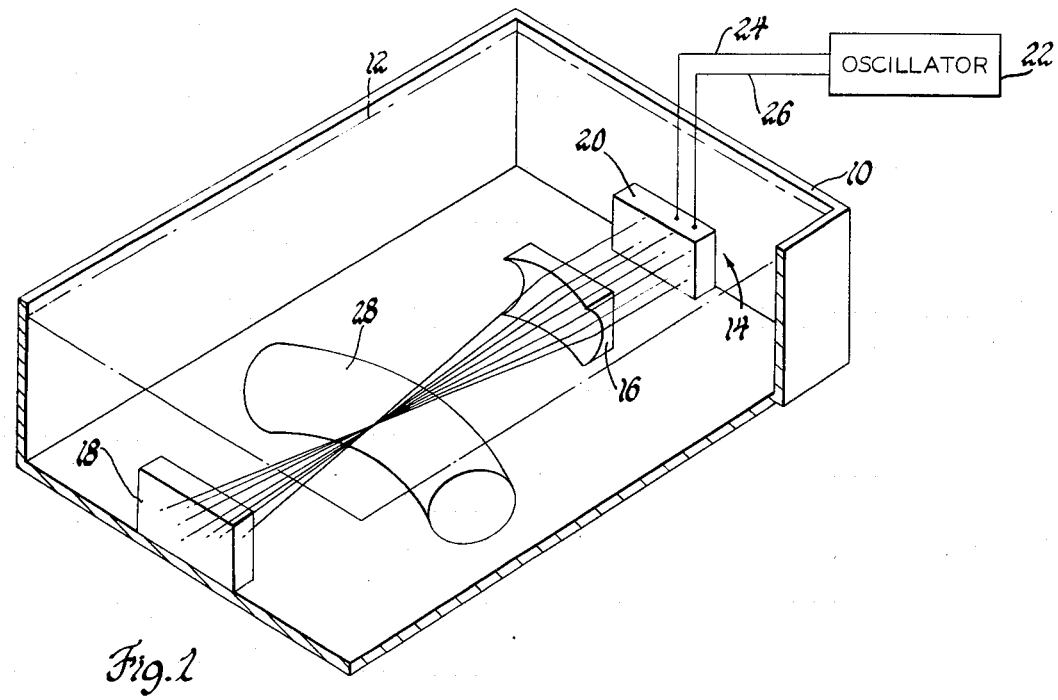
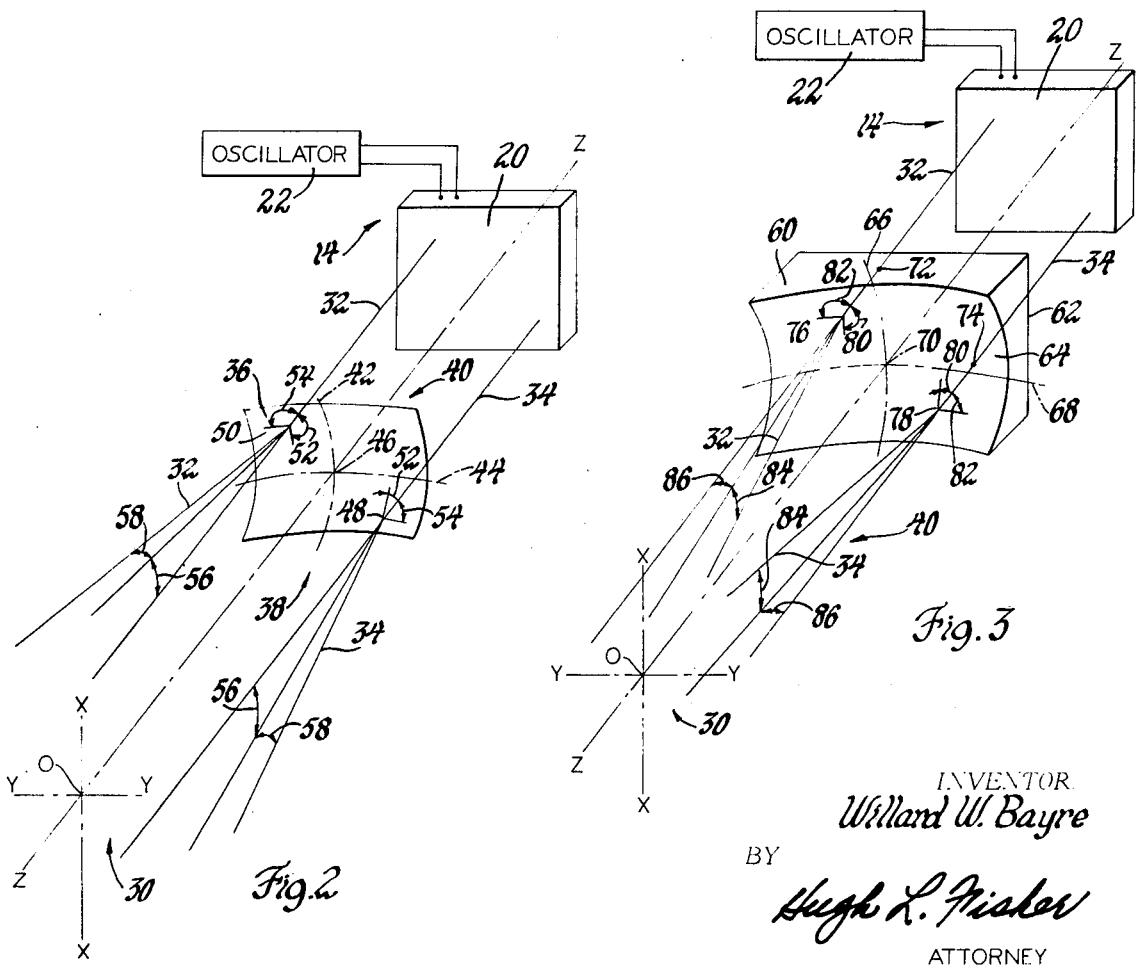

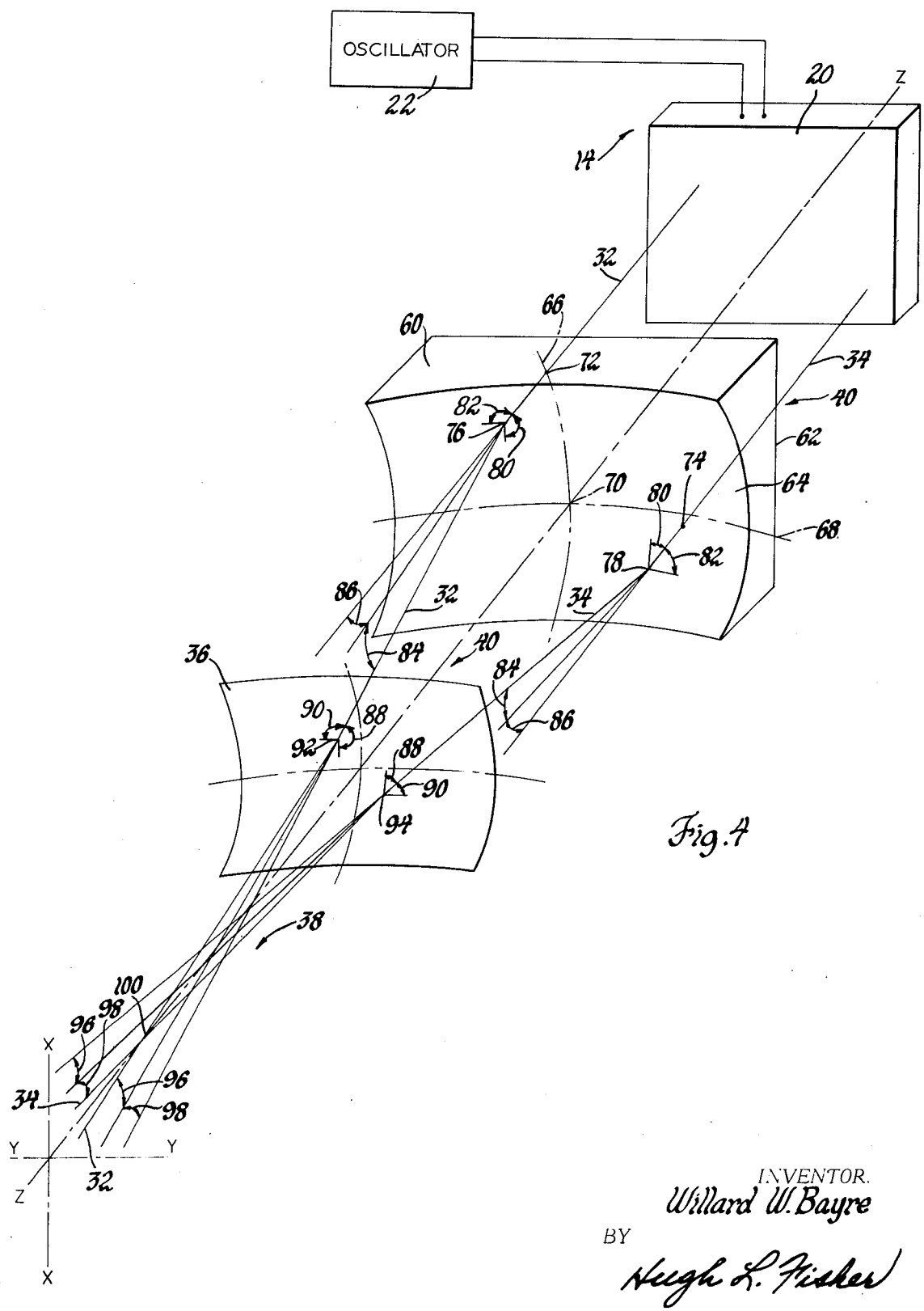

ULTRASONIC TESTING APPARATUS

This invention relates to an ultrasonic testing apparatus including an ultrasonic lens for focusing ultrasonic energy rays or wave trains at different angles along each of two perpendicular reference axes so as to converge the ultrasonic wave trains within a complex curved object to be tested.

Typically, in the ultrasonic testing of a solid object to detect internal flaws, a beam of ultrasonic energy rays or wave trains is transmitted through a liquid coupling medium into the test object thereby passing through an interface defined between the coupling medium and the test object. As ultrasonic wave trains pass obliquely through an interface defined between two mediums having different sonic propagation velocities, each of the ultrasonic wave trains is deflected from a straight path at an angle of refraction which is largely dependent upon the angle of incidence at which each of the ultrasonic wave trains strikes the interface.

Since the resolution of an ultrasonic testing apparatus is largely a function of the concentration of the ultrasonic wave trains within the test object, it is desirable to control the angle of refraction at the interface between the coupling medium and the test object so as to converge the ultrasonic wave trains within the test object. Therefore, it is customary to provide an ultrasonic lens to focus each of the ultrasonic wave trains at a predetermined angle so as to regulate the angle of incidence at the interface thereby controlling the angle of refraction within the test object.

However, where the test object is a compound curved body, such as a bent cylinder, the interface between the coupling medium and the test object can be approximately described by two different constant curvatures each extending along a different one of two perpendicular reference axes. Thus, where the test object takes the form of a bent cylinder, one reference axis extends longitudinally while the other reference axis extends transversely. In such instance, each of the ultrasonic wave trains penetrating the double curved interface between the coupling medium and the test object is deflected at a different angle of refraction along each of the reference axes due to the different angle of incidence at which each of the ultrasonic wave trains strikes the interface along each of the reference axes. Therefore, in order to effectively control the different angles of refraction so as to converge the ultrasonic wave trains within the test object, each of the ultrasonic wave trains must be focused by the ultrasonic lens at a different angle of incidence along each of the reference axes.

Accordingly, it is an object of this invention to provide an ultrasonic lens for focusing ultrasonic energy rays or wave trains passing therethrough at a different angle along each of the two perpendicular reference axes. It is another object of this invention to provide an ultrasonic testing apparatus including an ultrasonic lens for focusing ultrasonic energy rays or wave trains so as to separately control the different angle of refraction of each of the ultrasonic wave trains along each of two perpendicular references axes as the ultrasonic wave trains pass through a double curved interface approximately defined by two different constant curvatures each extending along a different one of the reference axes. It is a further object of this invention to provide an ultrasonic testing apparatus including an ultrasonic lens for focusing ultrasonic energy rays or wave trains so as to converge them within a complex curved test object.

In order to accomplish these and other objects, a preferred embodiment of the invention provides an ultrasonic lens comprising a sonic propagating body having a double curved focusing face defined by two different constant curvatures each extending along a different one of two perpendicular reference axes. Each of the ultrasonic energy rays or wave trains passing through the focusing face of the ultrasonic lens is deflected at a different angle of refraction along each of the reference axes as primarily determined by the different curvature of the focusing face extending along each of the reference axes.

The invention may be best understood by reference to the following detailed description of a preferred embodiment when considered in conjunction with the accompanying drawings, in which:

FIG. 1 is a perspective view of an ultrasonic testing apparatus incorporating the principles of the invention.

FIG. 2 is a perspective view of ultrasonic wave trains passing through a double curved interface defined between two mediums.

FIG. 3 is a perspective view of ultrasonic wave trains passing through an ultrasonic lens incorporating the principles of the invention.

FIG. 4 is a perspective view of ultrasonic wave trains passing through the ultrasonic lens illustrated in FIG. 3 and the interface illustrated in FIG. 2 wherein the ultrasonic lens is disposed in operative relationship with respect to the interface according to the invention.

Referring to FIG. 1, an ultrasonic inspection apparatus for detecting internal discontinuities within a test object is illustrated. The inventive ultrasonic testing apparatus includes a tank 10 containing a sonic propagating liquid coupling medium such as water indicated at 12. An ultrasonic wave generator 14, an ultrasonic lens 16, and an ultrasonic detector 18 are immersed within the liquid coupling medium. The ultrasonic wave generator 14 comprises an electroacoustical transducer 20 connected to a convention oscillator 22 by a pair of conductors 24 and 26. The transducer 20 may take the form of a quartz crystal. The lens 16 may be made of any suitable sound transmitting material such as a high density plastic. The detector 18 may be provided by an image cell or an electroacoustical transducer. A test object 28, which may take the form of a solid bent cylinder, is positioned within the liquid coupling medium between the lens 16 and the detector 18. Alternately, the lens 16 may be attached to the transducer 20.

In operation, the oscillator 22 drives the electroacoustical transducer 20 so as to produce an ultrasonic beam having a plurality of parallel ultrasonic energy rays or wave trains which are directed through the lens 16. The transducer 20 may be considered to comprise a plurality of elemental electroacoustical radiators, each emitting one of the ultrasonic energy rays or wave trains. The lens 16 focuses the ultrasonic wave trains in a manner to be further described so as to cause the ultrasonic wave trains to converge within the test object 28. The detector 18 senses the ultrasonic wave trains emerging from the test object 28 and provides an indication of the internal structure of the test object 28. The indication is visual in the case of an image cell and electrical in the case of an electroacoustical transducer.

With reference to FIGS. 2, 3 and 4, a coordinate system 30 is defined by three mutually perpendicular axes X, Y and Z which intersect at an origin O. An ultrasonic wave generator 14, as previously described, is positioned so as to transmit a plurality of ultrasonic energy rays or wave trains parallel to the Z axis. For purposes of description, consideration of the ultrasonic wave trains emitted by the ultrasonic wave generator 14 will be limited to two representative ultrasonic wave trains 32 and 34 which are coplanarly aligned an equal distance from the Z axis.

Referring particularly to FIG. 2, a double curved interface 36 is defined between two mediums 38 and 40 having different sonic propagation velocities such that the medium 38 has a greater sonic propagation velocity than the medium 40. It is to be understood that the interface 36 may be only an incremental portion of a larger complex curved interface defined between the mediums 38 and 40. For example, the interface 36 may denote that portion of the interface between the solid test object 28 and the liquid coupling medium 12 which is penetrated by the ultrasonic wave trains in FIG. 1. In such case, the medium 38 represents the test object 28 and the medium 40 represents the liquid coupling medium 12.

The interface 36 is approximately described by two different constant concave curvatures represented by the lines 42 and 44, respectively, which intersect at a point 46 perpendicular to the Z axis. The curvature 42 extends along the X axis, and the curvature 44 extends along the Y axis. As will be readily appreciated, any specific finite area of a complex curved interface can be approximately described by two different constant curvatures each extending along a different one of two perpendicular reference axes.

The ultrasonic energy rays or wave trains 32 and 34 produced by the ultrasonic wave generator 14 pass through the double curved interface 36 at points 48 and 50 where each of the ultrasonic wave trains 32 and 34 is deflected from a straight path due to refraction. The ultrasonic wave trains 32 and 34 each strike the interface 36 at different angles of incidence 52 and 54 along the X and Y axes, respectively, and are deflected at different angles of refraction 56 and 58 along the X and Y axes, respectively. The angles of refraction 56 and 58 are a function of the angles of incidence 52 and 54, respectively, and the ratio of the sonic propagation velocities of the mediums 38 and 40. However, since the ratio of the sonic propagation velocities of the mediums 38 and 40 is constant, the angles of refraction 56 and 58 are largely controlled by the angles of incidence 52 and 54. Inasmuch as the ultrasonic wave trains 32 and 34 are directed parallel to the Z axis which is perpendicular to the interface 36, the angles of incidence 52 and 54 are determined by the different constant concave curvatures 42 and 44 extending along the X and Y axes, respectively. Further, since the ultrasonic energy rays or wave trains 32 and 34 are coplanarly aligned an equal distance from the Z axis, the angles of incidence 52 and 54 and the corresponding angles of refraction 56 and 58 are the same for each of the ultrasonic wave trains 32 and 34. Thus, each of the ultrasonic wave trains 32 and 34 strikes the interface 36 at one angle of incidence 52 along the X axis and at a different angle of incidence 54 along the Y axis, and each of the ultrasonic wave trains 32 and 34 is correspondingly deflected at one angle of refraction 56 along the X axis and at a different angle of refraction 58 along the Y axis.

It will now be readily apparent that where it is desirable to separately control the angles of refraction 56 and 58 of the ultrasonic wave trains 32 and 34, as in the ultrasonic testing of the medium 38, an ultrasonic lens must be provided which is capable of focusing each of the ultrasonic wave trains 32 and 34 at a different angle along each of the X and Y axes so as to control the angles of incidence 52 and 54 of the ultrasonic wave trains 32 and 34. In the ultrasonic testing of the medium 38, which may represent the test object 28 in FIG. 1, it is advantageous to control the angles of refraction 56 and 58 so as to converge the ultrasonic wave trains 32 and 34 within the medium 38 thereby maximizing the sensitivity and the resolution of the ultrasonic testing apparatus.

Referring particularly to FIG. 3, an ultrasonic lens 60 is provided by a sound transmitting body as previously described with respect to FIG. 1. The ultrasonic lens 60 includes a planar entry face 62 and a double curved focusing face 64 coaxially spaced about the Z axis. The focusing face 64 is defined by two different constant concave curvatures represented by the lines 66 and 68, respectively, which intersect at a point 70 perpendicular to the Z axis. The curvature 66 extends along the X axis, and the curvature 68 extends along the Y axis. The ultrasonic lens 60 is immersed within the medium 40, which is preferably a liquid as described with respect to FIG. 2, so that both the entry face 62 and the focusing face 64 define an interface between the ultrasonic lens 60 and the medium 40.

The ultrasonic energy rays or wave trains 32 and 34 produced by the ultrasonic wave generator 14 pass perpendicularly into the planar entry face 62 at points 72 and 74 and pass obliquely out of the double curved focusing face 64 at points 76 and 78 where each of the ultrasonic wave trains 32 and 34 is deflected from a straight path due to refraction. The ultrasonic wave trains 32 and 34 each strike the focusing face 64 at different angles of incidence 80 and 82 along the X and Y axes, respectively, and are deflected at different angles of refraction 84 and 86 along the X and Y axes, respectively. Since the ultrasonic wave trains 32 and 34 each strike the entry face 62 at a perpendicular angle of incidence, no refraction occurs at the entry face 62.

Similar to the refraction of the wave trains 32 and 34 by the interface 36 in FIG. 2, the angles of refraction 84 and 86 are largely controlled by the angles of incidence 80 and 82, which are determined by the different constant concave curvatures 66 and 68 extending along the X and Y axes, respectively. Thus, each of the ultrasonic wave trains 34 and 36 strikes the focusing face 64 at one angle of incidence 80 along the X axis and at a different angle of incidence 82 along the Y axis, and each of the ultrasonic wave trains 32 and 34 is deflected at one angle of refraction 84 along the X axis and at a different angle of refraction 86 along the Y axis.

Referring to both FIGS. 2 and 3, it will now be readily apparent that the curvatures 66 and 68 of the focusing face 64 may be selected so that each of the ultrasonic wave trains 32 and 34 passing through the ultrasonic lens 60 is deflected at different predetermined angles of refraction 84 and 86 along the X and Y axes. Therefore, the ultrasonic lens 60 may be employed to direct the ultrasonic wave trains 32 and 34 through the interface 36 so as to control the different angles of incidence 52 and 54 at which each of the ultrasonic wave trains 32 and 34 strikes the interface 36 along the X and Y axes, thereby controlling the different angles of refraction 56 and 58 at which each of the ultrasonic wave trains 32 and 34 is deflected along the X and Y axes by the curvatures 42 and 44 of the interface 36.

The operation of the inventive ultrasonic lens 60 may be best understood by referring to FIG. 4 which is substantially a composite view of FIGS. 2 and 3 wherein like numerals are used to denote like elements. In FIG. 4, the ultrasonic lens 60 is coaxially aligned in operative relationship with the interface 36 about the Z axis so as to provide an ultrasonic testing arrangement similar to FIG. 1 wherein it is desired to converge the ultrasonic wave trains 32 and 34 within the medium 38.

The ultrasonic energy rays or wave trains 32 and 34 produced by the ultrasonic wave generator 14 pass into the ultrasonic lens 60 through the entry face 62 at the points 72 and 74 and pass out of the ultrasonic lens 60 through the focusing face 64 at the points 76 and 78. As the ultrasonic wave trains 32 and 34 penetrate the focusing face 64, each of the ultrasonic wave trains 32 and 34 is deflected at different angles of refraction 84 and 86 along the X and Y axes as controlled by the different angles of incidence 80 and 82 along the X and Y axes which are primarily determined by the different constant curvatures 66 and 68 extending along the X and Y axes. The different angles of refraction 84 and 86 in turn control the different angles of incidence 88 and 90 at which each of the ultrasonic wave trains 32 and 34 strikes the interface 36 along the X and Y axes. As the ultrasonic wave trains 32 and 34 pass through the interface 36 at points 92 and 94, each of the ultrasonic wave trains 32 and 34 is deflected at different angles of refractions 96 and 98 along the X and Y axes so as to converge the ultrasonic wave trains 32 and 34 at a point 100 on the Z axis within the medium 38. Thus, each of the ultrasonic wave trains 32 and 34 is focused by the ultrasonic lens 60 at different angles of refraction 84 and 86 along the X and Y axes so as to regulate the different angles of incidence 88 and 90 at which each of the ultrasonic wave trains 32 and 34 strikes the interface 36 along the X and Y axes thereby controlling the different angles of refraction 96 and 98 at which each of the ultrasonic wave trains 32 and 34 is deflected along the X and Y axes.

As will now be appreciated, the invention provides in ultrasonic lens for focusing ultrasonic energy rays or wave trains so as to control the different angles of refraction at which each of the ultrasonic wave trains is deflected as the ultrasonic wave trains pass through a complex curved interface defined between two mediums. Hence, the ultrasonic lens is especially adaptable for use in the ultrasonic testing of an object having a complex curved shape wherein it is desirable to control the different angles of refraction of each of the ultrasonic wave trains passing into the object so as to converge the ultrasonic wave trains within the object thereby increasing the sensitivity and the resolution of the ultrasonic testing apparatus. In actual ultrasonic testing applications, the inventive apparatus was found to yield three important advantages over existing ultrasonic testing apparatus, namely, greater sensitivity to small discontinuities, more uniform sensitivity with depth, and less interference in the near field zone.

It is to be understood that the preferred embodiment of the invention previously described is merely illustrative and that various alterations and modifications may be made without departing from the spirit and scope of the invention. Specifically, the interface 36 and the focusing face 64 of the ultrasonic lens 60 are not limited to double curved surfaces defined by two concave curvatures. If the curvatures 42 and 44 of interface 36 are convex, the curvatures 66 and 68 of the focusing face 64 of the ultrasonic lens 60 may be correspondingly made convex so as to converge the ultrasonic wave trains 32 and 34. Similarly, if one of the curvatures 42 and 44 of the interface 36 is concave while the other is convex, one of the curvatures 66 and 68 may be likewise made concave while the other is made convex. Further, the interface 36 may take the form of a straight cylindrical segment so that instead of being concave or convex, one of the curvatures 42 and 44 is flat.

The invention is to be limited only by the following claims.

What is claimed is:

1. An ultrasonic lens for focusing ultrasonic wave trains passing therethrough, comprising: a sonic propagating body having a double curved focusing face defined by two different curvatures each extending along a different one of two perpendicular reference axes so that each of the ultrasonic wave trains in an ultrasonic beam passing through the focusing face is deflected at a different angle of refraction along each of the reference axes as primarily determined by the different curvature of the focusing face extending along each of the reference axes.

2. An ultrasonic apparatus for transmitting ultrasonic wave trains, comprising: ultrasonic wave generating means for emitting an ultrasonic beam having a plurality of ultrasonic energy rays; and an ultrasonic lens including a sonic propagating body penetrated by the ultrasonic energy rays and having a double curved focusing face defined by two different curvatures each extending along a different one of two perpendicular reference axes so that each of the ultrasonic energy rays passing through the focusing face is deflected at a different angle of refraction along each of the reference axes as primarily determined by the different curvature of the focusing face extending along each of the reference axes.

3. An ultrasonic testing apparatus for inspecting a test object for internal flaws, comprising: ultrasonic wave generating means for emitting an ultrasonic beam having a plurality of ultrasonic wave trains; an ultrasonic lens for focusing the ultrasonic wave trains so as to converge the ultrasonic wave trains within the test object, the ultrasonic lens including a sonic propagating body penetrated by the ultrasonic wave trains and having a double curved focusing face defined by two different curvatures each extending along a different one of two perpendicular reference axes so that each of the ultrasonic wave trains passing through the focusing face is deflected at a different angle of refraction along each of the reference axes as primarily determined by the different curvature of the focusing face along each of the reference axes; and ultrasonic wave detecting means for sensing the ultrasonic wave trains emerging from the test object so as to produce an indication of the internal flaws within the test object.

4. An ultrasonic lens for focusing ultrasonic energy rays in an ultrasonic beam passing therethrough so as to direct the ultrasonic energy rays through a double curved interface approximately defined by two different constant curvatures each extending along a different one of two perpendicular reference axes thereby separately regulating the different angle of incidence of each of the ultrasonic energy rays along each of the reference axes so as to control the different angle of refraction of each of the ultrasonic energy rays along each of the reference axes, comprising: a sonic propagating body having a double curved focusing face defined by two different constant curvatures each extending along a different one of the reference axes so that each of the ultrasonic energy rays passing through the focusing face is deflected at a different angle of refraction along each of the reference axes as primarily determined by the different curvature of the focusing face extending along each of the reference axes.

5. An ultrasonic apparatus for transmitting a beam of ultrasonic wave trains through a double curved interface which is approximately defined by two different constant curvatures each extending along a different one of two perpendicular reference axes so that each of the ultrasonic wave trains is deflected at a different angle of refraction along each of the reference axes as primarily determined by the different angle of incidence at which each of the ultrasonic wave trains strikes the interface along each of the reference axes, comprising: ultrasonic wave generating means for emitting a plurality of ultrasonic wave trains perpendicular to the reference axes; and a sonic propagating body having a double curved focusing face defined by two different constant curvatures each extending along a different one of the reference axes so as to be penetrated by the ultrasonic wave trains, the constant curvatures of the focusing face being selected so that each of the ultrasonic wave trains passing through the focusing face is deflected at a different angle of refraction along each of the reference axes as primarily determined by the different curvature of the focusing face along each of the reference axes so as to regulate the different angle of incidence at which each of the ultrasonic wave trains strikes the interface along each of the reference axes thereby controlling the different angle of refraction at which each of the ultrasonic wave trains is deflected along each of the reference axes by the interface.

6. An ultrasonic testing apparatus for inspecting a complex curved test object for internal flaws wherein the test object is immersed within a coupling medium so that an interface is approximately defined between the coupling medium and the test object by two different constant curvatures each extending along a different one of two perpendicular reference axes, comprising: ultrasonic wave generating means for transmitting a beam of ultrasonic energy rays perpendicular to the reference axes; a sonic propagating body having a double curved focusing face defined by two different constant curvatures each extending along a different one of the reference axes so as to be penetrated by the ultrasonic energy rays, the constant curvatures of the focusing face being selected so that each of the ultrasonic energy rays passing through the focusing face is deflected at a different angle of refraction along each of the reference axes as primarily determined by the different curvature of the focusing face along each of the reference axes thereby regulating the different angle of incidence at which each of the ultrasonic energy rays strikes the interface along each of the reference axes so as to control the different angle of refraction at which each of the ultrasonic energy rays is deflected along each of the reference axes so as to converge the ultrasonic energy rays within the test object; and ultrasonic wave detecting means for sensing the ultrasonic energy rays emerging from the test object so as to produce an indication of the internal flaws within the test object.

* * * * *